Patented Oct. 31, 1944

2,361,639

UNITED STATES PATENT OFFICE 2,361,639

PROCESS FOR DEFIBERING LIGNO-CELLULOSIC MATERIALS

William Karl Loughborough, Madison, Wis., assignor to Henry A. Wallace, as Secretary of Agriculture of the United States of America, and his successors in office No Drawing. Application July 15, 1940,
Serial No. 345,677

3 Claims. (Cl. 92—6)

(Granted under the act of March 3, 1883, as
amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes, without the payment to me of any royalty thereon.

My invention relates to processes for defibering wood and other ligno-cellulosic materials and to products made from said defibered materials.

A principal object of my invention is to produce wood pulp from ligno-cellulosic materials.

A further object of my invention is to produce molded articles from ligno-cellulosic fibers.

A further object of my invention is to produce dense fiber boards from ligno-cellulosic fibers.

A further object of my invention is to produce dense laminated boards and molded articles from sheets of paper.

My invention, in its various modifications, is based upon the fact that aqueous solutions of urea and thiourea, separately or in mixture, have a marked softening effect upon lignin, cellulose, and ligno-cellulosic materials.

The prior art contains many references to urea and/or thiourea resins combined with cellulosic and ligneous fibers; but without exception these resins are produced by the addition of some extraneous chemical, usually formaldehyde, which condenses with the urea and/or thiourea.

I am well aware that the prior art includes mention of the use of urea and/or thiourea in the manufacture of fiber boards from ligno-cellulosic fibers (British Patent 407,161, accepted March 15, 1934); the effect produced being ascribed to a condensation of the urea and/or thiourea with the lignin in the fibers.

My invention is not to be confused with the above-mentioned patent. The concentrations of chemicals I use are very much greater than those taught by said patent; the product I secure is much heavier and harder than that described in said patent, also much darker in color; and I employ high temperatures for the express purpose of decomposing the added chemical or chemicals.

I have discovered that urea, $NH_2CONH_2$, and thiourea, $NH_2CSNH_2$, separately or in combination, have a marked softening effect, at elevated temperatures, upon lignin, cellulose, ligno-cellulose, and other natural constituents of trees and plants, and that this effect may be applied to produce new and useful results. Most of the experimental work upon which this application is based was done upon wood, wood lignin, and wood cellulose; but my invention is equally applicable to lignin, cellulose, and ligno-cellulose of other origin, such as vegetable fibrous materials. The discovered effects vary widely in intensity among the various ligneous and cellulosic materials of differing origins: therefore, successful application of my invention will depend in large measure upon the proper selection of materials, and successful utilization of any given material will likewise depend upon the proper selection of a suitable treating or conversion method. In general, the effects are most intense in the case of ligneous materials.

For brevity and clarity, whenever the word "ligno-cellulose" is used in this specification and in the claims, it is to be understood that I include in its definition and meaning both lignin and cellulose separately, as well as in combination, and also materials containing both lignin and cellulose and other natural constituents of trees and plants in varying proportions; and mixtures thereof. I have in mind particularly trees and plants of all kinds.

It is not possible, in the present state of the art, to state with complete certainty exactly what chemical reactions take place and what physical phenomena manifest themselves in the practice of my invention; but it appears now that most of the results secured support the hypothesis that the principal effective action is one of softening. However, it is probable, especially in the case of certain materials, such as oak wood for instance, which contain unusually large percentages of materials which are neither cellulosic nor ligneous, that a certain amount of condensation and resinification does take place during portions of some of the processes contemplated in my invention. But my invention is not primarily concerned with the formation of urea and/or thiourea resins through the condensation of the urea and/or thiourea with some extraneous chemical, other than cellulosic or ligneous material, added to the mass.

In previous experimental work I discovered that green wood may be readily impregnated with urea and/or thiourea by immersion in an aqueous solution of said chemical. The action is principally one of diffusion and it goes forward at atmospheric temperature and pressure. It may be hastened by the use of elevated temperature, but increased pressure has only a very small accelerating effect. Dry wood can also be impregnated in this manner, but the process is much slower than with green wood. Other methods of impregnation may also be used in the practice of my invention.

It is recognized that certain properties of the finished products, such as hygroscopicity, fire-resistance, smoothness, opacity, and printability may be modified by the addition of various well-known chemicals—principally water-soluble chemicals. My invention contemplates the use of such chemicals in addition to urea and/or thiourea.

If wet wood, and/or other ligno-cellulosic substances, impregnated with urea and/or thiourea, be heated it becomes very soft and pliable and the fibres may be readily separated by the use of any suitable disintegrating mill such as a Bauer mill, a rod mill, a ball mill, a Holland beater, a kollergang, a Jordan engine, or a wood pulp grinder; depending upon the species of wood used and the kind of fiber desired. My invention contemplates a pulping process, applicable to ligno-cellulosic materials of all kinds, in which the material, of suitable size such as wood chips, is softened and defibered in an aqueous solution of urea and/or thiourea.

For uses demanding further refinement, additional defibering and treating may be accomplished by any suitable well known mechanical means.

My process is not critical as to either concentration of said urea and/or thiourea or temperature of the solution. Usable temperatures are found in the range of 150° F. to 225° F.

Usable concentrations of said urea and/or thiourea are found in the range of ¼ pound of chemical to 2 pounds of chemical for each pound of water.

The time of digestion will be determined by the conditions of the cook; five to ten hours are sufficient for a wide range of conditions.

The digested semi-pulp is, in general, so well defibered that further defibering can be carried forward without special equipment or skill; and the refined pulp may be used for all products for which the presence of urea and/or thiourea is permissible, or necessary. For uses where the presence of said urea and/or thiourea is objectionable, said chemical must be removed by copious washing, by the use of diffusion batteries, or by other well known and suitable means.

Pulp produced by the practice of my invention is very clean and light in color and can be used, without bleaching, for many purposes normally demanding a bleached pulp.

Recovery of said urea and/or thiourea is anticipated whenever conditions are such as to make it profitable and/or desirable.

My invention also contemplates the impregnation, with urea and/or thiourea, of pulp wood intended for grinding by customary grinding methods; the purpose and result being a great reduction in the power required for grinding, coupled with a longer and better fiber.

The barked wood is placed in an aqueous solution of urea and/or thiourea and allowed to soak until the desired amount of said chemical has been absorbed. It is then ready for the grinder, without further treatment or processing. The temperature of the solution may range from atmospheric up to about 225° F.; but it is anticipated that the soaking will be done in open tanks, and for this condition temperatures much above 180° F. are not practical. The degree of concentration of said chemical is not critical but best results may be anticipated with concentrations as great as or greater than one pound of said chemical for every two pounds of water. Duration of soaking will be determined by surrounding conditions; it is anticipated that a period of one or several days will be required as a general rule.

Well known and suitable methods of grinding may be used; the greatest benefit will be derived from my invention, however, if temperatures of about 150° F., or slightly higher, are maintained during grinding. The wood pulp may be used for all products for which the presence of the urea and/or thiourea is permissible, or necessary. For uses where the presence of said chemical is objectionable, said chemical must be removed by copious washing, by the use of diffusion batteries, or by other well known and suitable means. Recovery of said chemical is anticipated whenever conditions are such as to make it profitable and/or desirable.

Ligno-cellulosic fibers and similar ligno-cellulosic materials, when impregnated with urea and/or thiourea and dried, become in essence molding powders and may be used as such by any suitable molding methods. My invention contemplates the production of molded articles composed largely or wholly of ligno-cellulosic materials combined with urea and/or thiourea. The individual steps in the process are simple and non-critical and may each be executed in various well known ways. The properties of the finished product can be controlled over wide ranges by proper selection of materials and details of processing; all in accordance with the skill and knowledge of those versed in the art. The use of fillers of various materials is contemplated. The first step in the process is the impregnation of the ligno-cellulosic material with urea and/or thiourea. This may be done in any customary manner such as by soaking in an aqueous solution of said urea and/or thiourea. The amount of said urea and/or thiourea required in the finished molding material will vary widely depending upon surrounding conditions. Good results have been secured with molding materials containing said urea and/or thiourea within the range of from 10 percent to 70 percent of the weight of the finished molding material, dry basis. After a sufficient amount of urea and/or thiourea has been absorbed, the next step is to dry the mass; an operation which may be performed in any well known manner suited to the specific nature of the materials. The simplest way is to drain or filter excess liquid off and then spread the mass in thin layers on trays and dry in a warm room or simple dry kiln. In the case of fibrous materials like wood pulp, for instance, it may be more convenient to form the mass into laps and then to dry the laps. For certain forms of finished product the dry laps, cut to proper size, may be placed in the molds and pressed. For other forms of finished product it may be necessary to shred the laps and use the shredded material as furnish for the mold.

In the case of fibrous materials, it may be found desirable to produce, direct from a suspension in an aqueous solution of urea and/or thiourea, a formed pulp lap of suitable thickness and of a form approximating that of the finished molded article. This step in the process may be carried forward in any well known and suitable manner, such as by means of a screen and suction pumps. The formed lap must then be dried to a degree sufficient to permit the final molding operation to be performed. The molding operation itself may be performed in any suitable and well known hot pressing manner. The characteristics of the material are such that molding pressures from 150 to 4000 pounds per square inch, usually about 3000 pounds per square inch, may be used; and temperatures of 280° F. to 360° F. in the material itself are suitable. Duration of the complete pressing operation, including final cooling, will generally be less than an hour.

Sheets of ligno-cellulosic fibers, impregnated with urea and/or thiourea may be laminated and pressed into fiber boards or otherwise molded at elevated temperatures. The impregnation may be accomplished at any convenient stage in the process, either before, during, or after forming the sheets.

My invention contemplates the production of fiber boards by laminating sheets of paper impregnated with urea and/or thiourea. The paper sheets should contain by weight, from 20 to 50 percent of urea and/or thiourea, and from 80 to 50 percent of fiber. For most efficient results, the major bulk of said urea and/or thiourea should be in the fibers themselves. This object may be attained by soaking said fibers for several hours in an aqueous solution of said urea and/or thiourea containing one pound of said urea and/or thiourea to one pound of water; or fiber produced by one of the pulping methods contemplated in this invention, and already containing suitable amounts of urea and/or thiourea, may be used. The sheets of paper are formed from the said impregnated fibers and dried in any well known and suitable manner, such as by the use of a Fourdrinier or cylinder paper machine. To avoid leaching of said urea and/or thiourea from said fibers it is desirable, in the paper-making operation, to suspend said fibers in an aqueous solution of said urea and/or thiourea instead of in water alone. The strength of solution to use will be determined largely by the paper-making system employed. In general, said solution should contain at least one pound of urea and/or thiourea for each four pounds of water. Considerations of economy dictate that every effort should be made to secure efficient recovery of said urea and/or thiourea by any well known means. The dry sheet material is cut up into sheets of suitable size, which are laminated into stacks of suitable thickness. The fiber direction of each sheet is oriented in accordance with whatever pattern may be desired. The stack of sheets is then placed in a press and subjected to heat and pressure. Pressures ranging from 150 to 4000 pounds per square inch, usually about 3000 pounds per square inch, may be used; and the temperature of the sheets may be in the range of 280° F. to 360° F. The duration of the pressure period will normally be less than an hour, including the necessary cooling period. After cooling, the finished fiber board is removed from the press. The above-described process can be used for molding many kinds of articles, such as trays for instance, which have a reasonably uniform thickness of material and which do not require a degree of flow beyond the ability of the stack of sheets to meet.

Specific examples of how my invention may be practiced follow:

I. To produce wood pulp: Wood chips, preferably free from knots and bark, are placed in an aqueous solution of urea and/or thiourea containing one part by weight of said chemical, when dry, for each part of water and are digested for a period of about one hour at a temperature of about 220° F. The digested chips, with about 10 times their weight of said solution, are then run into a rod mill and defibered to any desired degree. During this defibering operation the temperature within the rod mill should be maintained at about 180° F. The wood pulp produced by this method still contains large percentages of said chemical. If the presence of said chemical be objectionable for the intended use of the fibers, said chemical may be removed by copious washing with water; by the use of a diffusion battery; or by other well known and suitable means. On the other hand, there are many uses for which the presence of said chemical is beneficial, or necessary.

II. To produce fiber boards: Wood pulp, previously prepared by any process by which all or a large part of the lignin is retained by the individual fibers, is placed in an aqueous solution of urea and/or thiourea, containing one part by weight of said chemical, when dry, for each two parts of water, and allowed to soak for about 2 hours. The solution may contain other chemicals such as are customarily added to the furnish for sizing, waterproofing, fireproofing, etc. The amount of said solution required will be determined by the nature of the felting process employed. It is my intention that during the felting process, customary pulp densities be employed. After soaking, the wet pulp, in suspension in said chemical solution, is delivered to any suitable forming machine, such as a paper machine, or fiber board machine, and is formed into a sheet of desired size and thickness. The wet sheet is then dried in the customary manner. During the drying the temperature of the sheet should not exceed about 220° F. The final moisture content of the sheet should be about 2 to 5 percent. The dry sheet is then placed in a hot press and subjected to heat and pressure as follows: initial platen temperature about 220° F.; pressure about 4000 pounds per square inch; duration about half an hour. Raise the temperature of the sheets as rapidly as expedient to 360° F., at which temperature the press is held for about 10 minutes. Throughout the pressing period the pressure should be maintained at about 4000 pounds per square inch. Then the press is cooled under pressure as rapidly as convenient. The finished board is then removed from the press.

III. To produce molded pulp products: Wood pulp, previously prepared by any process by which all or a large part of the lignin is retained by the fibers, is placed in an aqueous solution of urea and/or thiourea, containing one part by weight of said chemical, when dry, for each two parts of water, and allowed to soak for about two hours. The solution may contain other chemicals, such as are customarily added to the furnish for sizing, waterproofing, etc. The amount of said solution will be determined by the nature of the felting process employed. It is my intention that during the felting process, customary pulp densities be employed. After soaking, the wet pulp, in suspension in said chemical solution, is delivered to a suitable wet machine, and run into laps. These laps are then dried, by any customary and suitable manner, to a moisture content of about 5 percent. During the drying, the temperature of the laps should not exceed 220° F. The dry laps are then shredded in any suitable and customary manner. The degree of fineness of the shredding will be determined by the detailed requirements of the subsequent molding process. The shredded fiber partakes of the nature of a molding powder and may be used as such by any suitable method. One method is as follows: Weigh out and place in a steam-heated mold the proper amount of dry shredded fiber. Assemble the mold and subject it to a pressure the equivalent of about 4000 pounds per square inch of mold area for a period of about 30 minutes. Ten minutes of this period should be at a temperature of about 360° F. The mold is then allowed to cool to a temperature of about 140° F. After cooling, the pressure may be released, the mold opened, and the finished article removed.

IV. To produce groundwood pulp: Spruce pulpwood, preferably free from bark and large knots, is soaked at a temperature of about 150° F. to 180° F. for a period of about four days in an aqueous solution of urea and/or thiourea, containing one pound of said chemical, when dry, for every two pounds of water. The pulpwood is then removed from the solution and ground in the customary manner in a pulpwood grinder. A temperature of about 150° F. should be maintained in the grinder, and a pressure of about 100 pounds per square inch of pocket area should be maintained. The amount of said chemical remaining within the fibers will, in general, not be deleterious for customary groundwood fiber uses. If and when it becomes desirable to remove part or all of the remaining chemical this may be accomplished by copious washing with water.

V. To produce molded products from flat laps of pulp: Chips of green oak wood, preferably free from bark, are digested for a period of about one hour at a temperature of about 220° F. in an aqueous solution of urea and/or thiourea, containing one pound of said chemical, when dry, for each pound of water. The digested chips, with enough of said chemical solution to cover them, are then transferred to a rod mill, and defibered. During this defibering process, the temperature of the mass within the rod mill should be about 150° F. The proper duration of this defibering can easily be determined by anyone familiar with the operation of pulp-defibering rod mills. After the chips have been sufficiently defibered, the resulting pulp with enough of said chemical solution to make a proper consistence for beating is transferred to a Holland beater where it is suitably refined.

After the pulp has been suitably refined in the beater, it is transferred to a wet machine, with enough of said chemical solution to make a proper consistence for the operation of said wet machine. The pulp is now run into laps, and dried. The drying temperature should not exceed 220° F. The thickness of the dry lap should be about three times that of the finished molded article.

A dry lap of pulp is placed in the mold and pressed at about 3000 pounds per square inch of projected mold area. The temperature of the press should be raised as quickly as expedient to about 360° F., which temperature may well be maintained for about 10 minutes. The mold is then cooled under pressure, after which it is opened and the finished molded article removed.

VI. To produce molded articles from molded laps of pulp: Oak fibers, prepared in such manner as to retain most of the originally present lignin, are suspended in an aqueous solution of urea and/or thiourea containing one pound of said chemical, when dry, for every two pounds of water and allowed to soak at least 4 hours. The consistence of the pulp should be about 3 percent. Said pulp is then flowed over a screen having approximately the shape of the finished molded article, the whitewater being drawn away by means of a suction pump. When the layer of fibers formed on the screen by this process has reached the desired thickness, the screen and the lap of pulp are removed and placed in a warm dry room for drying. Once dry, the lap is removed from the screen and placed in the mold. The mold is closed and pressed in a hot press. The temperature is raised as rapidly as expedient to about 360° F., which temperature is maintained for a period of about 10 minutes. During the pressing process a pressure of about 3000 pounds per square inch is maintained. The mold is then cooled under pressure and opened when cooled, completing the process.

VII. To produce paper suitable for laminating and molding: Oak fibers, which have been pulped by the urea-defibering process heretofore described, are suspended in an aqueous solution of urea and/or thiourea containing one part of said chemical, when dry, for every two parts of water. The consistence of this pulp should be about 1 percent. Said pulp is then run over a Fourdrinier paper machine in the customary well-known manner, completing the process. Care must be used to keep the temperature of the dryers down to about 225° F.

VIII. To produce laminated articles from urea-impregnated paper: Sheets of urea-impregnated paper, prepared in accordance with the method heretofore described, are trimmed to the proper size and are layered up into a stack of proper thickness. They are then placed in a mold, and the mold closed. The mold is then pressed in a hot press, at a temperature of about 360° F. for a period not to exceed 10 minutes at a pressure which may range from 1000 to 4000 pounds per square inch. The mold is then cooled under pressure and opened when cool, completing the process. The process is equally applicable to flat plate molds and to curved molds.

Having thus described my invention, what I claim for Letters Patent is:

1. In the manufacture of pulp from fibrous ligno-cellulose, the steps comprising soaking the ligno-cellulose at a temperature between 70° F. and 150° F. in an aqueous solution of a chemical, said chemical being chosen from the group consisting of urea, thiourea, and urea and thiourea combined, said solution containing ¼ to 2 pounds of chemical for each pound of water, in the absence of any previous cooking and in the absence of any previous digestion; followed by heating said ligno-cellulose in said solution to a temperature of 150° F. to 225° F.; followed by mechanically difibering said soaked and heated ligno-cellulose at a temperature of 150° F. to 225° F.

2. In the manufacture of pulp from wood chips, the steps comprising soaking said chips for about one hour in an aqueous solution of a chemical chosen from the group consisting of urea, thiourea, and urea and thiourea combined, said solution containing one part by weight of said chemical for each part of water, at a temperature of about 220° F.; followed by mechanically defibering said soaked chips at a temperature of 150° F. to 225° F.

3. In the manufacture of ground wood pulp; the steps comprising soaking the barked wood for a period of about 4 days in an aqueous solution of a chemical chosen from the group consisting of urea, thiourea, and urea and thiourea combined, said solution containing about one pound of said chemical for every two pounds of water, at a temperature of 150° F. to 180° F.; followed by grinding said soaked wood at a temperature of about 150° F.

WILLIAM KARL LOUGHBOROUGH.